United States Patent
Yeh et al.

(10) Patent No.: US 7,146,570 B2
(45) Date of Patent: Dec. 5, 2006

(54) METHOD OF AND INTERACTIVE DISPLAY FOR EXCHANGING A MESSAGE

(75) Inventors: Li-Fen Yeh, Taipeh (TW); Tzu-Hong Wang, Taipeh (TW)

(73) Assignee: Koninklijke Philips Electronics N.V., Eindhoven (NL)

( * ) Notice: Subject to any disclaimer, the term of this patent is extended or adjusted under 35 U.S.C. 154(b) by 624 days.

(21) Appl. No.: 10/202,686

(22) Filed: Jul. 23, 2002

(65) Prior Publication Data

US 2003/0076354 A1    Apr. 24, 2003

(30) Foreign Application Priority Data

Jul. 25, 2001    (EP)    ................... 01202848

(51) Int. Cl.
*G06F 3/00*    (2006.01)
(52) U.S. Cl. ............. 715/758; 715/733; 715/752; 715/753; 715/765; 715/835
(58) Field of Classification Search ............ 715/700, 715/733, 752, 753, 758, 764, 781, 835, 838, 715/846, 864
See application file for complete search history.

(56) References Cited

U.S. PATENT DOCUMENTS

| | | | |
|---|---|---|---|
| 6,101,532 A * | 8/2000 | Horibe et al. ............... 709/206 |
| 6,234,802 B1 | 5/2001 | Pella et al. .................. 434/156 |
| 6,385,646 B1 * | 5/2002 | Brown et al. ............... 709/217 |
| 6,426,761 B1 * | 7/2002 | Kanevsky et al. .......... 715/788 |
| 6,470,381 B1 * | 10/2002 | De Boor et al. ............ 709/217 |
| 6,731,308 B1 * | 5/2004 | Tang et al. .................. 715/751 |
| 2002/0021307 A1 * | 2/2002 | Glenn et al. ................ 345/753 |
| 2002/0075304 A1 * | 6/2002 | Thompson et al. |
| 2002/0109706 A1 * | 8/2002 | Lincke et al. ............... 345/700 |
| 2002/0170040 A1 * | 11/2002 | Idan |
| 2003/0164862 A1 * | 9/2003 | Cadiz et al. ................ 345/838 |
| 2003/0179222 A1 * | 9/2003 | Noma et al. |
| 2003/0233425 A1 * | 12/2003 | Lyons et al. |
| 2004/0039934 A1 * | 2/2004 | Land et al. |

* cited by examiner

*Primary Examiner*—Lucila X. Bautista

(57) ABSTRACT

The social communicative activity is getting involved with internet technology more frequently. People are chatting, playing games and working over the internet. In order to introduce persons being part of one communicative environment to each other a method of exchanging messages is provided that displays a first graphical representation of a first person; displays a second graphical representation of a second person (408); presents a first introduction message (402) to the first person; the message introducing the second person to the first person; and presents a second introduction message to the second person; the message introducing the first person to the second person.

21 Claims, 3 Drawing Sheets

METHOD OF AND INTERACTIVE DISPLAY FOR EXCHANGING A MESSAGE

The invention relates to a method of exchanging messages, the method comprising:

displaying a first graphical representation of a first person; and displaying a second graphical representation of a second person.

Further, the invention relates to an interactive display conceived to exchange messages, the interactive display comprising:

first display means conceived to display a first graphical representation of a first person; and second display means conceived to display a second graphical representation of a second person.

Further, the invention relates to a computer program product and the invention relates to a personal digital assistant.

An embodiment of the method, interactive display, computer program product and personal digital assistant of the kind set forth above is known from U.S. Pat. No. 6,234,802. Here, a method and system for teaching a language to a user in a digitally synthesized interactive three-dimensional graphic representation of an environment are disclosed. The user appears to be situated in the environment and moves within the environment by adjusting the graphical representation of the environment in response to user input. When the user encounters a representation of a person in the environment, the person communicates a challenge to the user, such as by playing a full motion digital video clip of the person. To challenge the user, the person asks the user a question or requests that the user performs a task. The challenge requires language comprehension by the user to correctly respond.

It is an object of the current invention to provide a method that provides an intuitive interaction with a representation of a person in a graphical representation of an environment. In order to achieve this object, the method of exchanging messages according to the preamble is characterized in that the method further comprises:

presenting a first introduction message to the first person; the first introduction message introducing the second person to the first person;

presenting a second introduction message to the second person; the second introduction message introducing the first person to the second person.

By providing graphical representations of a first and a second person within a graphical representation of an environment, a viewing person, for example a user, of these graphical representations sees the relationship between these two persons. In order to introduce these two persons to each other graphically, messages are sent from the first person to the second person and vice versa without the need to the two persons to meet each other physically.

An embodiment of the method of exchanging messages according to the invention is described in claim 2. By triggering the presentation of the introducing message through the selection of the graphical representations of the persons, there is control of which person is being introduced to another person. A third person who knows both persons can perform the control or one of the persons can perform it.

An embodiment of the method of exchanging messages according to the invention is described in claim 3. By including graphical representation of the person who is being introduced, the receiving person of the message receives an indication of the person who is being introduced.

An embodiment of the method of exchanging messages according to the invention is described in claim 4. The graphical representations of the persons within the environment may represent a special relationship between the persons, for example not formally introduced. To emphasize this relationship, a graphical indication from one person to the other person indicates that there exists such special relationship.

An embodiment of the method of exchanging messages according to the invention is described in claim 5. Furthermore, the graphical indication can indicate a bilateral relationship between the persons when there's a graphical indication from one person to the other and vice versa. Thus both persons control the display of the relation between the graphical representations of the persons.

An embodiment of the method of exchanging messages according to the invention is described in claim 6. By sending personal information together with the introduction messages, the persons receive additional information about the other person to whom he or she is being introduced.

It is a further object of the current invention to provide an interactive display that provides an intuitive interaction with a representation of a person in a graphical representation of an environment. In order to achieve this object, the interactive display according to the preamble is characterized in that the interactive display further comprises:

first presenting means conceived to present a first introduction message to the first person; the first introduction message introducing the second person to the first person;

second presenting means conceived to present a second introduction message to the second person; the second introduction message introducing the first person to the second person.

An embodiment of the interactive display according to the invention is described in claim 8.

Embodiments of the computer program product and personal digital assistant are described in claims 9 and 10 respectively.

The invention will be described by means of embodiments illustrated by the following drawings.

The social communicative activity is getting involved with internet technology more frequently. People are chatting, playing games and working over the internet. Although there exists a lot of communication applications for the internet environment, these applications are often stand-alone and do not provide interaction between the applications. Furthermore, these applications provide limited capabilities for facilitating people during social interaction.

Figure 1:
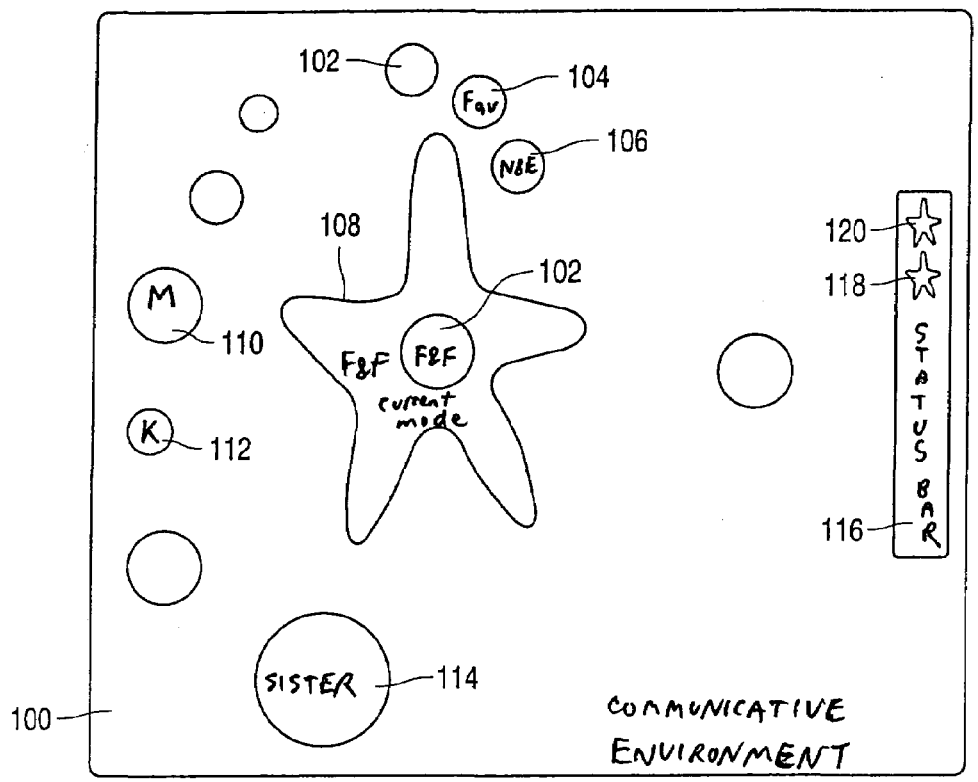
FIG. 1 illustrates an environment to support social interaction between people.

FIG. 1 illustrates an environment 100 to support social interaction between people. The communicative environment is displayed on a display comprised within a handheld device. The handheld device is a personal digital assistant (PDA), but it can also be a telephone, a handheld personal computer and the like. The communicative environment represents the users social environment graphically and comprises three modes: "friends and family" 102, "favorites" 104, and "new and exploring" 106. Within the figure, the communicative environment is within the "friend and family" mode as illustrated with 108. The orbiting graphics represent friends, for example Mary 110 and Kim 112 or family, for example Sister 114. Users switch between the modes by pointing with a pointing device like a mouse, pen or the like to one corresponding graphical representation 102, 104 or 106 of the modes. Once the mode is changed, the orbiting graphics change automatically and represent those features that correspond to the chosen mode. The number of modes is not limited. More modes can be selected too, like for example "work", "vacation" etc.

Within the mode "friend and family", the graphical representation of the persons represent the relation with the user, say Carol. When the user did not interact with a person recently, the graphical representation of that person becomes smaller like the graphical representation of Kim 112 with a minimum size. When the user did interact with a person recently the graphical representation of that person like the graphical representation of Sister 114 becomes larger, with a maximum size. The size of the representation can also depend upon the frequency with which a user has contacted another person. The graphical representations of the persons comprise the name or alias of the person in order to facilitate identification of the graphical representations. The status bar 116 comprises graphical representations of the persons that are currently on-line. Within the example, 120 represents Mary and 118 represents Kim. For example, when the real-life Mary comes on-line her PDA or any other system as previously mentioned will send a message to the PDA of the user Carol. This message will be interpreted as being sent by a PDA with a signature that Mary did come on-line and the representation 120 of Mary will be shown within the status bar 116. When Mary gets off-line the opposite will occur: The PDA of Mary will send a message to the PDA of the user indicating that Mary is off-line and the representation 120 of Mary will disappear from the status bar 116.

Figure 2:
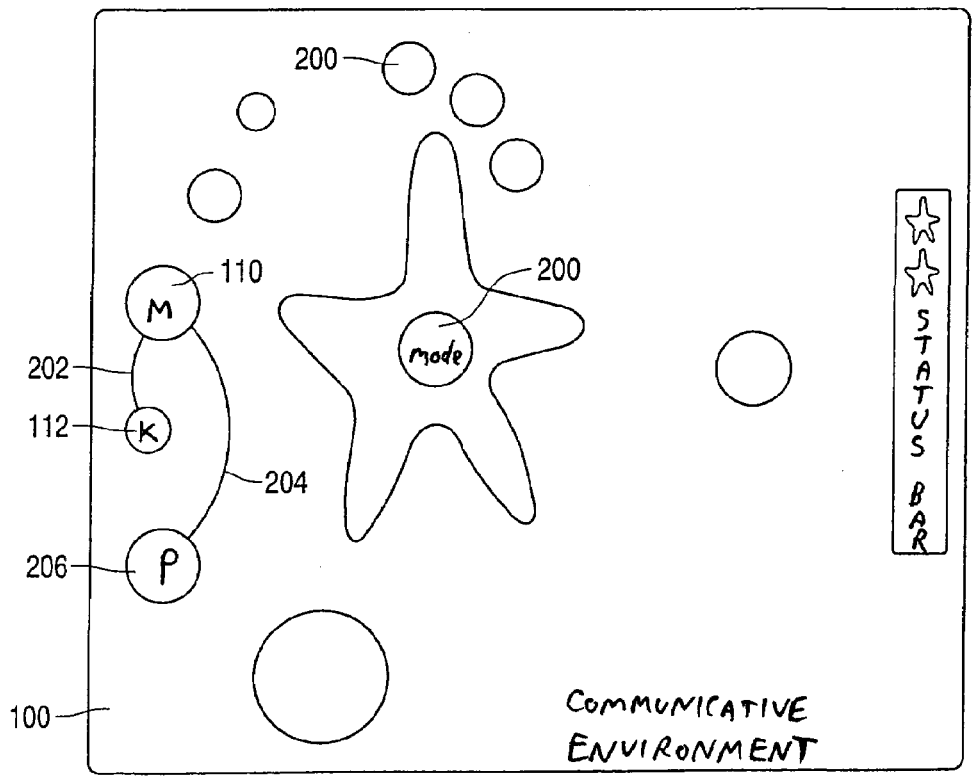
FIG. 2 illustrates a mode of the communicative environment that shows the real-life relationships between the represented persons.

FIG. 2 illustrates a mode 200 of the communicative environment 100 that shows the real-life relationships between the represented persons. Curve 202 that is drawn from Mary 110 to Kim 112 illustrates that Mary 110 and Kim 112 are acquainted with each other. The graphical representation of the real-life relationship may be al kinds of graphics like icons, arrows etc. Curve 204 represents the real-life relationship between Mary 110 and Peter 206. According to the user of the PDA, there exists no real-life relationship between Kim 112 and Peter 206, because there's no graphical connection between Kim 112 and Peter 206.

Figure 3:
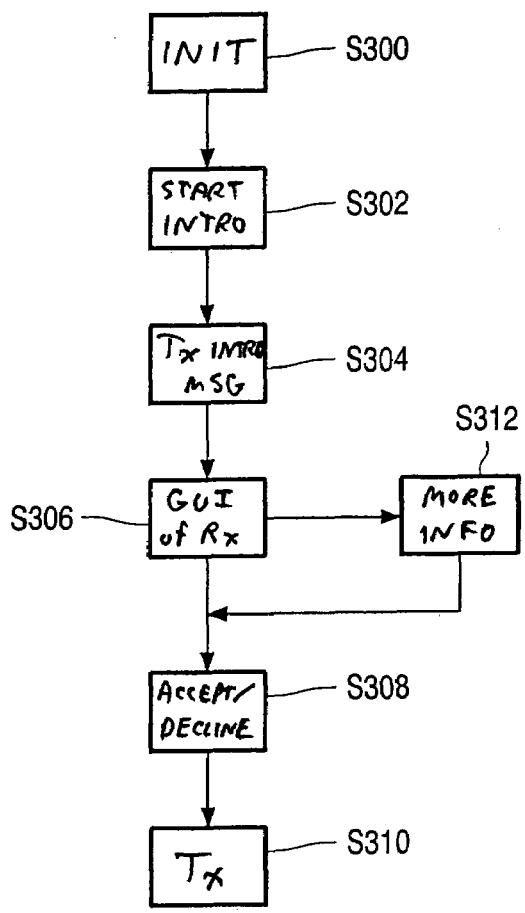
FIG. 3 illustrates the main steps of the method according to the invention.
Figure 4:
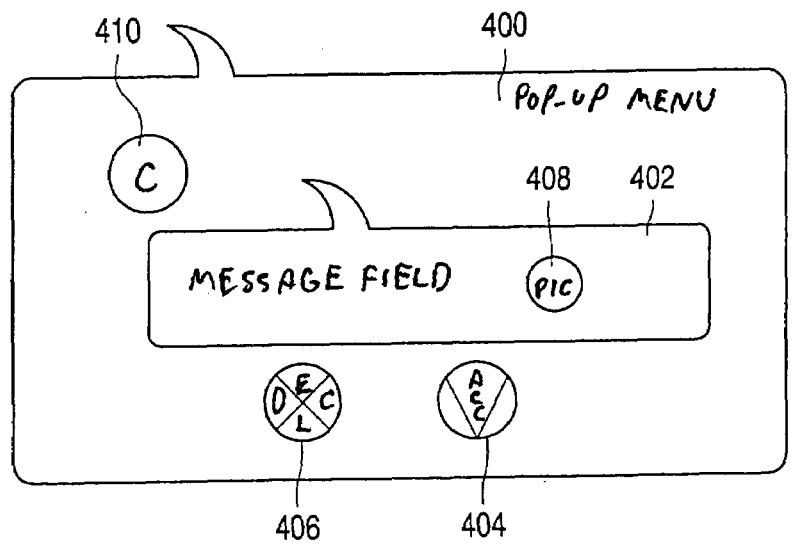
FIG. 4 illustrates a pop-up menu comprising a introduction message.

FIG. 3 illustrates the main steps of the method according to the invention. Step S300 is an initialization step during which the user of the PDA selects the mode 200 of the communicative environment 100 that shows the real-life relationships between the represented persons. Within step S302, Carol starts introducing the real-life Kim and Peter to each other by pointing with a pointing device like a mouse, pen or the like to the graphical representation of Kim 112 or Peter 206 and drawing a dashed curve from Kim 112 to Peter 206 or the opposite way. By drawing this dashed curve, Kim and Peter can be introduced to the communicative environments of each other. Within step S304 data of the user's PDA is send to the PDAs of Kim and Peter comprising a message that an introduction message is being send. In order to send the data, the PDA uses WAP or bluetooth or the internet when it is connected to the internet. Within step S306, the software comprised within the receiving PDA interprets the data and the message and triggers the display of a pop-up menu on the user interface of the receiving PDA. This pop-up menu is illustrated in FIG. 4. Here 400, is the pop-up menu displayed on the user interface of the PDA of Kim. Field 402 comprises the message that the user Carol likes to introduce a friend named Peter: "Carol introduces a new friend Peter to you". The message may also comprise a graphical representation 408 like a photo or video of Peter in stead of the name. A corresponding pop-up menu is displayed on the user interface of the PDA of Peter. Then Field 402 comprises a message that the user Carol likes to introduce a friend named Kim: "Carol introduces a new friend Kim to you". When Kim or Peter want to receive more information about the person that is being introduced, optional step S312 is performed. Carol, the one who introduces the friends is represented by 410. Within this step Kim and Peter can select the name or graphical representation of the person that is being introduced. This selection is sent to the PDA of Carol. Then this PDA will retrieve personal information comprised within the PDA and send this information back to the PDA that requested for the information. The information comprises personal information like, gender and hobbies. When the person does not want to have his or her personal information being sent with introduction messages, a message comprising "not available" will be send to the receiving PDA. Upon receipt of the personal information message, this information will be displayed within the introduction message.

Within S308 Kim accepts being introduced to the new friend Peter. The graphical representation of Peter will then be added to the communicative environment of the PDA of Kim within the mode "friend and family". Kim can also decide to decline being introduced to a new friend Peter. Then the graphical representation of Peter will not be added to her communicative environment. The same holds for Peter: he can accept or decline being introduced to the new friend Kim and the graphical representation of Kim will be added to the communicative environment of the PDA of Peter only when he accepts. In order to accept, Kim and Peter must point to the "Accept" button 404 present on the pop-up menu. In order to decline Kim and Peter must point to the "Decline" button 406 on the pop-up menu, see FIG. 4. After pressing one of these buttons, the popup will disappear from the user interface and the corresponding communicative environment will be displayed again.

Within step S310, the "Accept" message of Kim will be send to the PDA of Carol and the "Accept" message of Peter will be send to the PDA of Carol. When "Decline" was chosen, then the "Decline" message is send to the PDA of Carol. The software comprised within the PDA of Carol interprets the message and will display a solid line curve from the graphical representation of Kim 112 to Peter 206 when they both accepted being introduced to each other. Other representations can be chosen too to indicate that Kim and Peter are being introduced to each other and have accepted.

Figure 5:
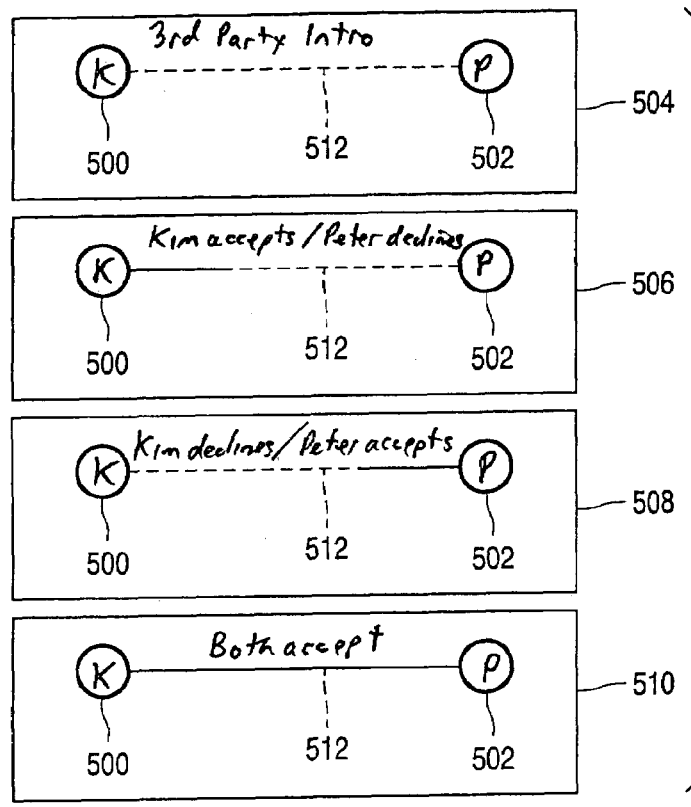
FIG. 5 illustrates some examples of curves.

FIG. 5 illustrates some examples (not limiting) of curves between the graphical representation of Kim and Peter. Here, 500 is the graphical representation of Kim and 502 is the graphical representation of Peter. As illustrated, 504 is the situation of step S302 wherein Carol starts introducing Peter and Kim to each other. The curve 512 is then a dashed line. 506 illustrates the situation of step S310 if Kim accepts and Peter declines. Then the curve 512 comprises a part with a solid curve to indicate that Kim accepted and Peter declines. 508 illustrates the situation of step S310 if Kim declines and Peter accepts. Then the curve 512 comprises a part with a solid curve to indicate that Peter accepts and Kim declines. 510 illustrates the situation of step S3 10 if Kim accepts and Peter accepts. Then the curve 512 is solid curve to indicate that both accepted. The illustrated representation of the curve is not limiting.

Figure 6:
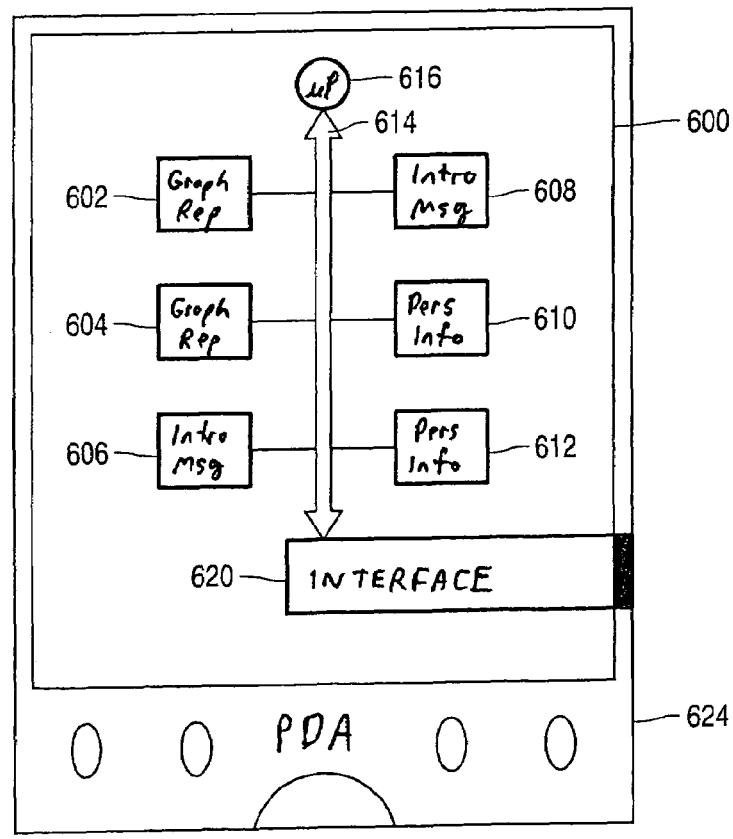
FIG. 6 illustrates the main parts of the system according to the invention in a schematic way.

FIG. 6 illustrates the main parts of the system 600 according to the invention in a schematic way. The system comprises memories 602, 604, 606, 608, 610 and 612. These memories are connected to each other via software bus 614. The memories 602 and 604 comprise computer readable code designed to present graphical representations of persons. Memories 606 and 608 comprise computer readable code designed to present the introduction messages, 610 and 612 comprise the personal information of the persons being a member of the communicative environment. Furthermore, the system 600 comprises a processor 616 that can execute the computer readable code and it comprises an interface 620 that is connected to the software bus 614 too. This interface 620 is for example blue tooth enabled and translates the received signal into streams that can be interpreted by the system 600. The interface can also be connected to the internet or can support WAP technology. The system is comprised within a personal digital assistant 624.

The invention claimed is:

1. A computer implemented method of exchanging messages, the method comprising:
    displaying a first graphical representation of a first person;
    displaying a second graphical representation of a second person, the second representation being displayed spaced apart, by a space, from the first representation on a display;
    presenting a first introduction message to the first person, the first introduction message introducing the second person to the first person;
    presenting a second introduction message to the second person, the second introduction message introducing the first person to the second person; and
    displaying a link that spans said space if at least one of a third party introduction is made between the two persons and at least one of the two persons accepts an introduction to the other of the two.

2. The method of claim 1, wherein presenting the first introduction message and presenting the second introduction message is triggered by selecting the first graphical representation and the second graphical representation.

3. The method of claim 1, wherein the second introduction message comprises the first graphical representation of the first person end the first introduction message comprises the second graphical representation of the second person.

4. The method of claim 1, wherein the first person selects the second graphical representation to trigger displaying a first graphical indication between the first graphical representation and the second graphical representation.

5. The method of claim 1, wherein the second person selects the first graphical represeutation to trigger displaying a second graphical indication between the first graphical representation and the second graphical representation.

6. The method of claim 1, further comprising:
    sending first personal information of the first person to the second person by means of the second introduction message; and
    sending second personal information of the second person to the first person by means of the first introduction message.

7. A computer program product that includes a computer readable medium into which is embedded program instructions executable by a processor in performing the method according to claim 1.

8. A personal digital assistant comprising a computer program product according to claim 7.

9. The computer-implemented method of claim 1, further comprising adding, as a result of acceptance of an introduction in response to a received one of the introduction messages, for a person being thereby introduced and for presentation on said interactive display, a graphical representation of said person being thereby introduced.

10. A computer-implemented interactive display for exchanging messages, the interactive display comprising:
    first display means for displaying a first graphical representation of a first person;
    second display means for displaying a second graphical representation of a second person, the second representation being displayed spaced apart, by a space, from the first representation on said interactive display;
    first presenting means for presenting a first introduction message to the first person, the first introduction message introducing the second person to the first person;
    second presenting means for presenting a second introduction message to the second person, the second introduction message introducing the first person to the second person; and
    link display means for displaying a link that spans said space if at least one of a third party introduction is made between the two persons and at least one of the two persons accepts an introduction to the other of the two.

11. The interactive display according to claim 10, further comprising:
    first personal information means for presenting first personal information of the first person to the second person;
    second personal information means for presenting second personal information of the second person to the first person.

12. The interactive display of claim 10, wherein said link display means is configured for said displaying a link if at least one of the two persons accepts an introduction to the other of the two.

13. The interactive display of claim 10, configured to display the link simultaneously with the two representations.

14. The interactive display of claim 10, wherein said link display means is configured for said displaying a link if said third party introduction is made between the two persons.

15. The interactive display of claim 10, wherein said representations vary in size according to at least one of recency and frequency of interaction with a user of said display.

16. The computer-implemented interactive display of claim 10, wherein said representations respectively vary in size according to at least one of recency and frequency of interaction, by means of the computer-implemented display, between the respective person and a user of the computer-implemented interactive display.

17. The computer-implemented interactive display of claim 10, wherein the first and second display means are configured such that acceptance of an introduction in response to a received one of the introduction messages adds, for a person being thereby introduced and for presentation on said interactive display, a graphical representation of said person being thereby introduced.

18. The computer-implemented interactive display of claim 10, wherein said displaying by the first means is simultaneous with said displaying by the second means.

19. The computer-implemented interactive display of claim 10, wherein said link display means is further configured for selectively displaying a link to traverse part of a space between the two representations based on a determination that a relationship exists between the two persons.

20. The computer-implemented interactive display of claim 10, wherein the link is configured to selectively include at least one of a plurality of different visual elements depending upon a status of acceptance of a made introduction from among said third party introduction and said introduction to the other of the two, said at least one of a plurality of different visual elements correspondingly spanning said space in case of one element and collectively spanning said space in case of plural elements.

21. A computer implemented method of exchanging messages, the method comprising:
  displaying a first graphical representation of a first person;
  displaying a second graphical representation of a second person, the second representation being displayed spaced apart, by a space, from the first representation on a display;
  presenting a first introduction message to the first person, the first introduction message introducing the second person to the first person;
  presenting a second introduction message to the second person, the second introduction message introducing the first person to the second person; and
  displaying a link that spans said space if at least one of a third party introduction is made between the two persons and at least one of the two persons accepts an introduction to the other of the two, wherein the link is configured to selectively include at least one of a plurality of different visual elements depending upon a status of acceptance of a made introduction from among said third party introduction and said introduction to the other of the two, said at least one of a plurality of different visual elements correspondingly spanning said space in case of one element and collectively spanning said space in case of plural elements.

* * * * *